UNITED STATES PATENT OFFICE.

VLADIMIR BREDLIK, OF NEW YORK, N. Y.

PURIFICATION OF AMMONIUM SALTS.

1,346,106.   Specification of Letters Patent.   Patented July 13, 1920.

No Drawing.   Application filed August 23, 1919. Serial No. 319,507.

*To all whom it may concern:*

Be it known that I, VLADIMIR BREDLIK, a citizen of the Republic of Czechoslovakia, and resident of the city, county, and State of New York, have invented certain new and useful Improvements in the Purification of Ammonium Salts, of which the following is a specification.

Ammonium sulfate is usually produced by passing ammonia vapors through a bath of sulfuric acid, the salt crystallizing out and being then separated from the solution by draining off the latter, after which the salt is partially dried and further freed of acid in a centrifugal machine. There still remains a comparatively small acid content which is an impurity in the salt. Similar processes are used for producing other salts of ammonium, the ammonia vapors being treated with nitric, hydrochloric, oxalic or other suitable acid to produce ammonium nitrate, chlorid, oxalate or other desired salt. In each case there remains a certain acid content as an impurity which is more or less objectionable in all these salts. My invention provides an economical and efficient means of further purifying the salt obtained in this or any similar way.

I treat the crude or impure ammonium salt with crude ammonia liquor from which the organic impurities have been first removed, this treated ammonia liquor serving to neutralize the acid content in the ammonium salt.

In plants for the manufacture of ammonium salts by the above method there is also produced an ammonia solution or crude ammonia liquor which is exceedingly impure. It usually contains three classes of impurities, first, solid matter such as carbon and dirt, second, organic matters such as tar, pyridin, phenol, cresol, acridin, etc., and third, inorganic ammonia salts such as the carbonate, chlorid, cyanate, etc. If the ammonium salt were washed with this crude ammonia liquor the resulting salt would have a disagreeable odor or a bad color or both because of the organic impurities in the ammonia liquor. The inorganic ammonia salts in the liquor would not introduce any objectionable qualities into the ammonium salt. I, therefore, first remove the organic impurities, and the solids if any, from the crude liquor and then use this treated liquor for neutralizing the acid in the ammonium salt.

The crude liquor is preferably treated with a solvent for the organic impurities. Benzol or one of its homologues is suitable for this purpose and needs only to be intimately mixed with the crude liquor in order to dissolve out the organic impurities. The solvent is then removed and the ammonia liquor is used to wash the ammonium salt and to neutralize all or a substantial part of the acid therein.

Various modifications may be made in the steps of the process and in the exact materials used without departing from the invention as defined in the following claims.

What I claim is:

1. The method of preparing a neutralizing agent for treating ammonium salts containing free acid which consists in dissolving out the organic impurities from crude ammonia liquor.

2. The method of preparing a neutralizing agent for ammonium salts containing free acid which consists in dissolving out the organic impurities from crude ammonia liquor with benzol.

3. The method of preparing a neutralizing agent for treating ammonium salts containing free acid which consists in dissolving out the organic impurities from crude ammonia liquor, and filtering out the solid impurities.

4. A neutralizing agent for treating ammonium salts containing free acid which consists of crude ammonia liquor from which the organic impurities have been removed.

5. A neutralizing agent for treating ammonium salts containing free acid which consists of crude ammonia liquor from which the organic impurities have been removed, and from which the solid material has been filtered out.

In witness whereof, I have hereunto signed my name.

VLADIMIR BREDLIK.